United States Patent
Ito

(10) Patent No.: US 6,722,796 B2
(45) Date of Patent: Apr. 20, 2004

(54) CAMERA

(75) Inventor: Kenji Ito, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/376,085

(22) Filed: Feb. 28, 2003

(65) Prior Publication Data

US 2003/0170018 A1 Sep. 11, 2003

(30) Foreign Application Priority Data

Mar. 5, 2002 (JP) ........................................ 2002-059149

(51) Int. Cl.⁷ ............................................... G03B 17/02

(52) U.S. Cl. ........................ 396/411; 396/418; 396/538

(58) Field of Search ................................ 396/411, 418, 396/538

(56) References Cited

U.S. PATENT DOCUMENTS 4,967,213 A * 10/1990 Han ........................... 396/405
6,317,568 B1 * 11/2001 Williams et al. ............ 396/535

\* cited by examiner

*Primary Examiner*—David M. Gray
(74) *Attorney, Agent, or Firm*—Robin, Blecker & Daley

(57) ABSTRACT

A camera equipped with an accommodating chamber which constitutes a periphery including a film spool spindle and which accommodates a film cartridge having a recess at one longitudinal end thereof, includes: a protruding surface portion which is provided in the accommodating chamber, which enters the recess, and which has on the outer surface thereof on the side opposite to the film cartridge a step formed by a recessed portion recessed toward the film cartridge; and a gear member arranged in the recessed portion and adapted to be engaged with the spool spindle to rotate the spool spindle, whereby the dimension in the camera height direction (i.e., the dimension in the longitudinal direction of the film cartridge) is reduced.

4 Claims, 4 Drawing Sheets

CAMERA

BACKGROUND OF THE INVENTION

1. Field of the Invention

The present invention relates to a camera in which it is possible to achieve a reduction in size in the height direction of the portion of the camera main body where there is arranged an accommodating chamber accommodating a film cartridge for taking up camera film.

2. Related Background Art

There is a demand for a reduction in camera size as a way of spreading the use of cameras, and various small-size cameras have been developed and put into practical use. In this regard, the camera using a film cartridge accommodating a roll of film is also required to be as small as possible.

On the other hand, a compact camera today is equipped with a film feeding mechanism for automatically performing the operation of taking up the film on the spool from the cartridge and the operation of rewinding the film taken up on the spool back into the cartridge, using a film feeding motor as the drive source.

Further, there is a camera in which the film feeding motor is arranged inside the spool and in which a rewinding spindle engaged with the winding shaft of the cartridge is arranged in the cartridge chamber; the rewinding spindle is connected to the film feeding motor through a gear row; and there is provided a power transmission mechanism which transmits the power of the film feeding motor selectively to the spool or the rewinding spindle through a speed reduction mechanism.

As a mounting structure for the feeding gears in the gear row for transmitting the power of the film feeding motor to the rewinding spindle, a structure is known in which a support wall is formed so as to be parallel to the upper or lower surface of the camera main body forming the cartridge chamber and the spool chamber, with the feeding gear being fitted onto a boss portion formed on this support wall.

FIG. 2 is a sectional view of a cartridge chamber and its periphery. Reference numeral 10 indicates a casing member forming the outer casing of the camera, reference numeral 11 indicates a camera body, and reference numeral 19 indicates a cartridge chamber accommodating a cartridge 13 described below. Reference numeral 12 indicates a film, and reference numeral 13 indicates the cartridge for taking up and accommodating the film 12. When it is inserted into the cartridge chamber 19, the cartridge 13 is urged downwards as seen in the drawing under the urging force of a spring (not shown) provided in the cartridge chamber 19. As a result, the cartridge 13 abuts an abutment surface 11b forming the lower surface of the cartridge chamber 19.

Reference numeral 14 indicates an idler gear which transmits power from a motor (not shown) provided in the camera main body, that is, the power for rewinding the film 12, to a fork gear 15 described below. The idler gear 14 is rotatable around a rotation shaft 14a, which is arranged radially outside with respect to the cartridge chamber 19.

Reference numeral 15 indicates the fork gear in mesh with the idler gear 14 and adapted to be rotated by the torque of the idler gear 14. Reference numeral 16 indicates a fork which rotates integrally with the fork gear 15. Reference numeral 17 indicates a fork spring, which is arranged radially inside with respect to the fork gear 15 and the fork 16 and which pushes the fork 16 upwardly as seen in the drawing.

When the cartridge 13 is inserted into the cartridge chamber 19, the fork 16 is engaged with a spool portion 12a of the cartridge 13, and is pushed downwardly as seen in the drawing by this spool portion 12a against the urging force of the fork spring 17.

The fork gear 15 is rotatably fitted into a hole 11c formed in the wall portion 11b constituting the lower surface of the cartridge chamber 19. Reference numeral 18 indicates a gear pressing member, which rotatably supports the idler gear 14 and the fork gear 15.

In the structure in the prior art described above, the dimension of the camera main body as measured in the height direction cannot be made smaller than a predetermined length due to the restriction by the arrangement space for the drive portion (the feeding gear, etc.) for driving the film. In this regard, Japanese Patent Application Laid-Open No. 8-136989 discloses a camera in which a gear is arranged above the cartridge chamber, with the gear being rotatably mounted to a retaining plate.

In such a construction, the height of the camera main body is determined by the length of the cartridge, the thickness of the retaining plate, and the thickness of the gear, and even if the components are arranged close to each other, there is a limitation to the reduction in the dimension of the camera main body as measured in the height direction (i.e., reduction in camera size).

SUMMARY OF THE INVENTION

It is a first object of the present invention to provide a camera with a reduced height.

According to one aspect of the invention, a camera equipped with an accommodating chamber which accommodates a film cartridge having a recess at one longitudinal end, and film spool spindle thereof, includes:

- a protruding surface portion which is provided in the accommodating chamber, which enters the recess, and which has on the outer surface thereof on the side opposite to the film cartridge a step formed by a recessed portion recessed toward the film cartridge; and
- a gear member arranged in the recessed portion and adapted to be engaged with the spool spindle to rotate the spool spindle.

In further another aspect of the invention, the camera further includes a support plate which rotatably supports the gear member.

In further another aspect of the invention, the camera further includes an idler gear engaged with the gear member and adapted to transmit torque to the gear member.

That is, by bringing the gear member nearer to the film cartridge by utilizing the space of the recess formed in one longitudinal end surface of the film cartridge, it is possible to make the longitudinal dimension of the cartridge accommodating portion so much the smaller. And, when the casing member forming the outer casing of the camera main body is arranged close to the support member, it is possible to reduce the height of the camera main body as compared with that in the prior art. (i.e., to achieve a reduction in camera size)

Further according to another aspect of the invention, a camera equipped with an accommodating chamber which accommodates a film cartridge having a recess at one longitudinal end, and film spool spindle thereof, includes:

- a gear member engaged with the film spool spindle to rotate the film spool spindle;
- a retaining member rotatably retaining the gear member; and an opening formed in a portion of the accommodating chamber corresponding to the recess of the film cartridge, the gear member entering the opening.

That is, by bringing the gear member nearer to the film cartridge by utilizing the space generated by forming a hole in the cartridge accommodating portion, it is possible, as in the first aspect of the invention, to make the longitudinal dimension of the cartridge accommodating portion, that is, the height of the camera main body so much the smaller as compared with that in the prior art (i.e., to achieve a reduction in camera size).

When the gear member is rotatably retained by the support member, it is possible to prevent the gear member from wobbling in the longitudinal direction of the cartridge accommodating portion (film cartridge).

DETAILED DESCRIPTION OF THE PREFERRED EMBODIMENTS (First Embodiment)

Figure 1:
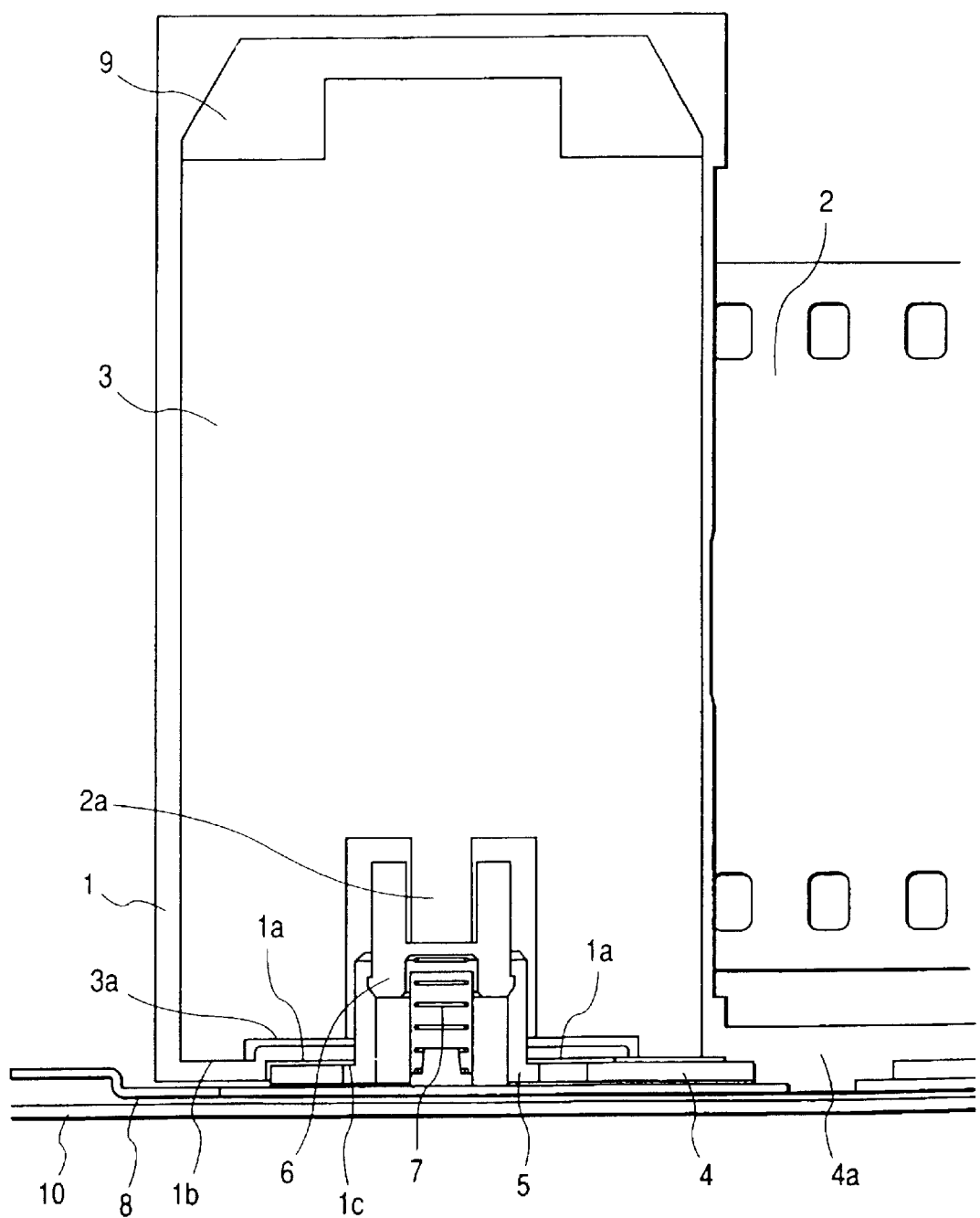
FIG. 1 is a sectional view of a cartridge chamber and its periphery of a camera according to a first embodiment.
Figure 4:
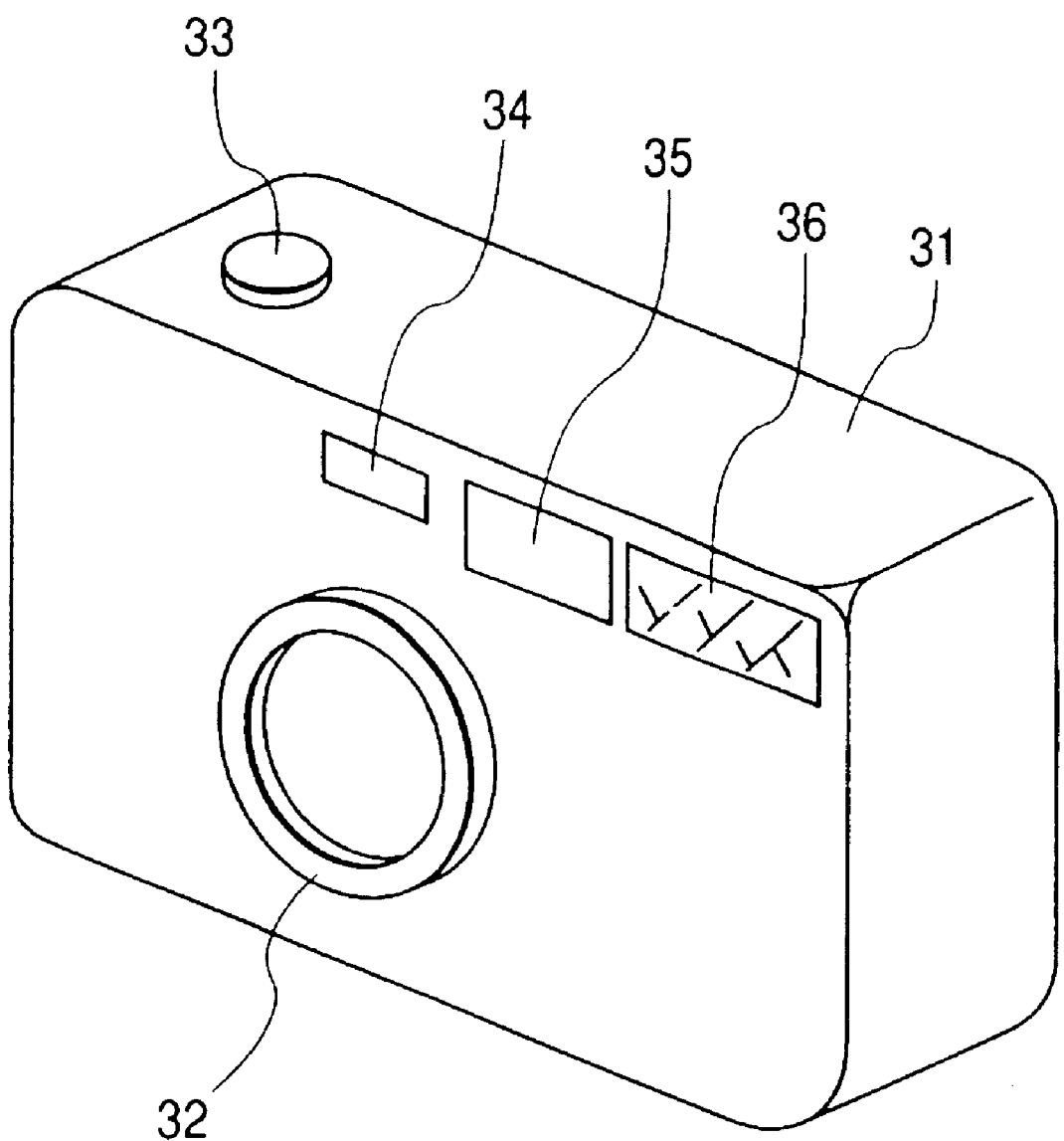
FIG. 4 is an external perspective view of the camera of the first embodiment.

FIG. 1 is a sectional view of a cartridge chamber and its periphery of a camera according to a first embodiment of the present invention. FIG. 4 is an external perspective view of the camera of this embodiment.

In FIG. 4, reference numeral 31 indicates a camera main body. At the center of the front surface of this camera main body 31, there is provided a photographing lens barrel 32 capable of zooming. Further, on the right-hand side, as seen in the drawing, of the front surface of the camera main body 31, there is provided a light emission window member 36 constituting a strobe device, and, in the vicinity thereof, there are provided a viewfinder window 34 and a photometry window 35. Further, on the top surface of the camera main body 31, there is provided a shutter release button 33 for starting exposure of the film (not shown) in the camera main body 31.

In FIG. 1, reference numeral 1 indicates a camera body, and reference numeral 9 indicates a cartridge chamber (cartridge accommodating portion) for accommodating a cartridge 3 described below. Reference numeral 2 indicates a film, and reference numeral 3 indicates the cartridge (film cartridge) for taking up and accommodating the film 2. When it is inserted into the cartridge chamber 9, the cartridge 3 is urged downwards as seen in the drawing under the urging force of a spring (not shown) provided in the cartridge chamber 9. As a result, the cartridge 3 abuts an abutment surface 1b constituting the lower surface of the cartridge chamber 9.

Reference numeral 4 indicates an idler gear, which transmits power from a motor (not shown) provided in the camera main body 31, that is, the power for rewinding the film 2, to a fork gear 5. The idler gear 4 is rotatable around a rotation shaft 4a, which is provided radially outside with respect to the cartridge chamber 9.

Reference numeral 5 indicates the fork gear, which is in mesh with the idler gear 4 to be rotated by the torque of the idler gear 4. Reference numeral 6 indicates a fork, which rotates integrally with the fork gear 5. Reference numeral 7 indicates a fork spring, which is arranged radially inside with respect to the fork gear 5 and the fork 6 and pushes the fork 6 upwards as seen in the drawing.

When the cartridge 3 is inserted into the cartridge chamber 9, the fork 6 is engaged with a spool portion 2a of the cartridge 3, and is pushed downwards as seen in the drawing by this spool portion 2a against the urging force of the fork spring 7.

The fork gear 5 is rotatably fitted into a hole 1c formed in the wall portion 1b constituting the bottom surface of the cartridge chamber 9. Reference numeral 8 indicates a gear pressing member, which rotatably retains the idler gear 4 and the fork gear 5. Reference numeral 10 indicates a casing member forming the outer casing of the camera main body 31 and arranged in close vicinity to the gear pressing member 8.

Next, the features of this embodiment will be described.

A recess 3a is formed in the lower surface of the cartridge 3, and the section of this recess 3a taken along a plane perpendicular to the longitudinal direction of the cartridge 3 is substantially circular. A circular protrusion 1a is formed on the bottom surface of the cartridge chamber 9 on the camera main body side, and this protrusion 1a enters the recess 3a of the cartridge 3. And, the fork gear 5 is arranged in the space formed between the protrusion 1a and the gear pressing member 8.

Figure 2:
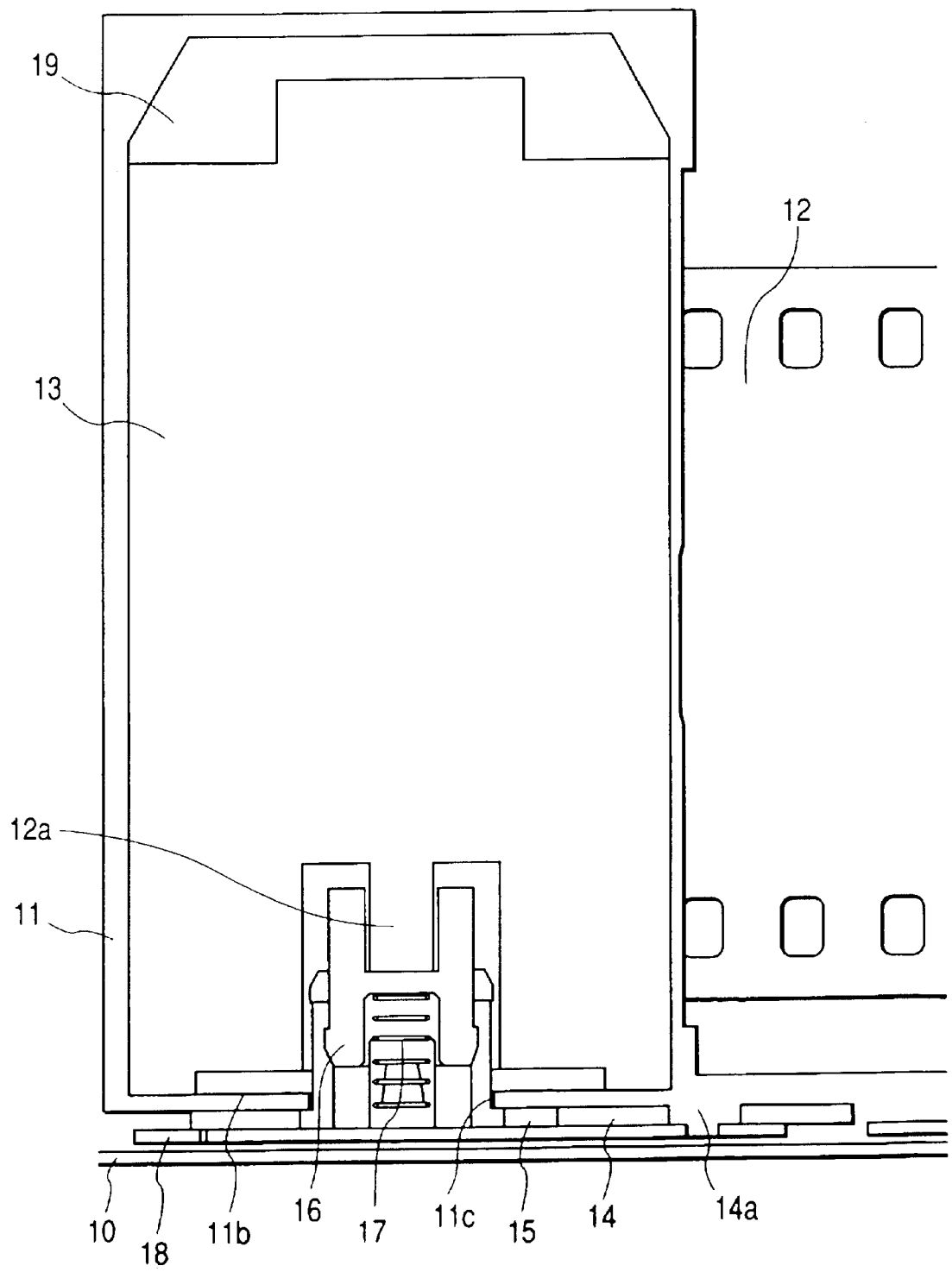
FIG. 2 is a sectional view of a cartridge chamber and its periphery of a camera in the prior art.

By thus accommodating the fork gear 5 in the protrusion 1a, it is possible for the gear pressing member 8 to be arranged so as to extend along the bottom portion of the cartridge chamber 9, and it is possible to substantially eliminate that space in the structure in the prior art shown in FIG. 2 which is between the bottom surface of the cartridge chamber 19 and the gear pressing member 18 and in which the fork gear 15 is arranged. That is, the fork gear 5 and the gear pressing member 8 can be brought nearer to the cartridge 3, and the longitudinal dimension of the cartridge chamber 9 can be made so much the smaller. Since the casing member 10 is arranged in the vicinity of the gear pressing member 8, bringing the gear pressing member 8 nearer to the cartridge 3 makes it possible to reduce the height of the camera main body (that is, to achieve a reduction in camera size).

Further, since the fork gear 5 is held between the protrusion 1a and the gear pressing member 8, it is possible to prevent the fork gear 5 from moving in the longitudinal direction of the cartridge 3.

Since the fork gear 5 is in mesh with the idler gear 4, it is necessary to secure an arrangement space for the idler gear 4 under the cartridge 3. In view of this, no abutment surface 1b is formed on the shaft portion 4a side of the lower portion of the cartridge 3. This makes it possible for the fork gear 5, the idler gear 4, and the gear pressing member 8 to be arranged so as to be parallel to each other and to extend in the direction perpendicular to the longitudinal direction of the cartridge 3 (i.e., in the horizontal direction of the camera main body).

(Second Embodiment)

Figure 3:
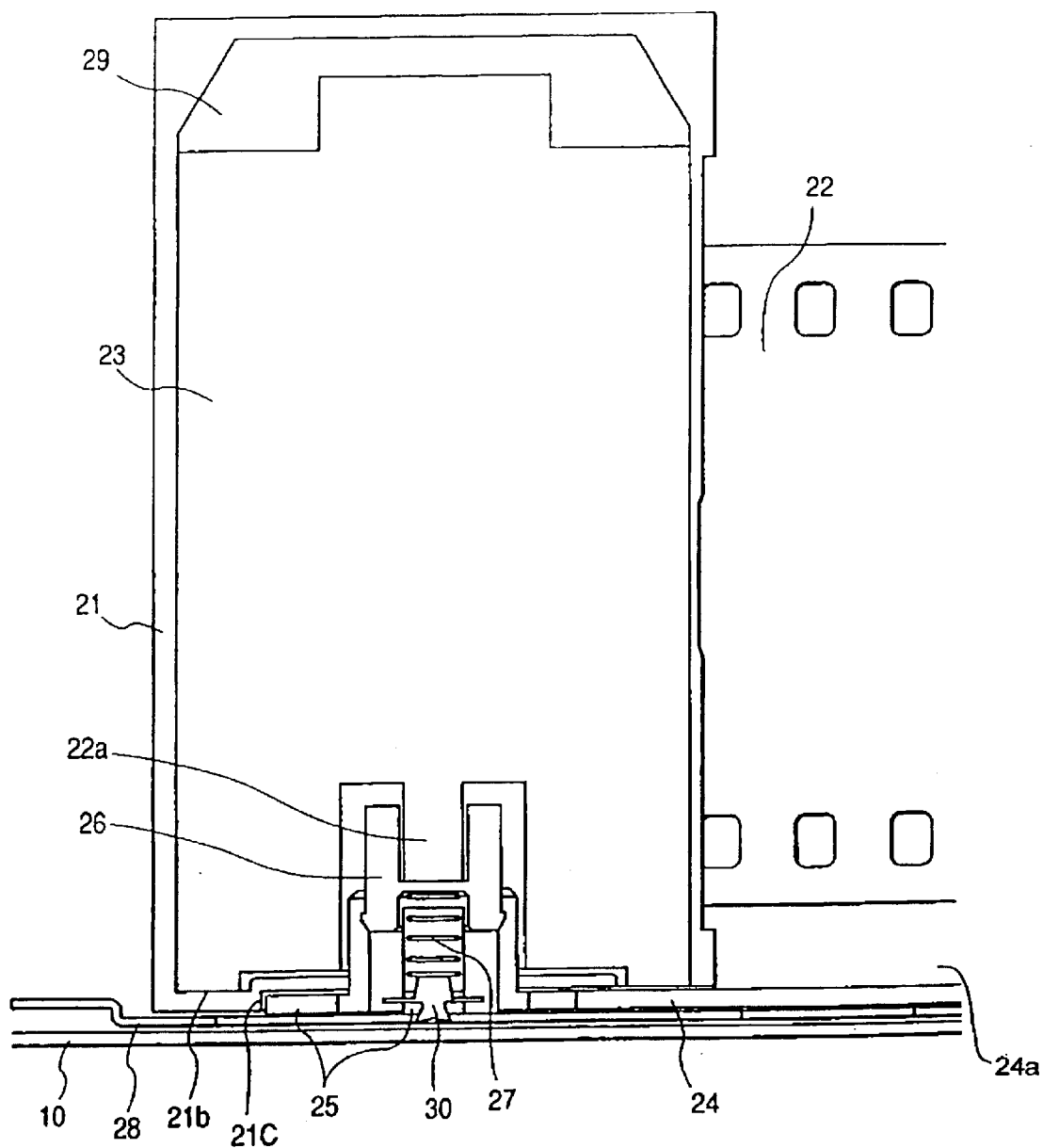
FIG. 3 a sectional view of a cartridge chamber and its periphery of a camera according to a second embodiment.

FIG. 3 is a sectional view of a cartridge chamber and its periphery of a camera according to a second embodiment of the present invention. The camera of this embodiment has the same outward appearance as that of the first embodiment (FIG. 4).

In FIG. 3, reference numeral 21 indicates a camera body, and reference numeral 29 indicates a cartridge chamber (cartridge accommodating portion) for accommodating a cartridge 23 described below. Reference numeral 22 indicates a film, and reference numeral 23 indicates the cartridge (film cartridge) for taking up and accommodating the film 22. When it is inserted into the cartridge chamber 29, the cartridge 23 is urged downwards as seen in the drawing under the urging force of a spring (not shown) provided in the cartridge chamber 29. As a result, the cartridge 23 abuts an abutment surface 21b formed on the lower surface of the cartridge chamber 29. There is formed in the abutment surface 21b of the camera body a hole 21c whose diameter is smaller than the outer diameter of the cartridge, and a fork gear 25 enters this hole 21c.

Reference numeral 24 indicates an idler gear, which transmits power from a motor (not shown) provided in the camera main body 31, that is, the power for rewinding the film 22, to the fork gear 25 described below. The idler gear 24 is rotatable around a rotation shaft 24a, which is provided radially outside with respect to the cartridge chamber 29.

Reference numeral 25 indicates a fork gear in mesh with the idler gear 24 and adapted to be rotated by the torque of the idler gear 24. Reference numeral 26 indicates a fork which rotates integrally with the fork gear 25. Reference numeral 27 indicates a fork spring, which is arranged radially inside with respect to the fork gear 25 and the fork 26 and which pushes the fork 26 upwardly as seen in the drawing.

When the cartridge 23 is inserted into the cartridge chamber 29, the fork 26 is engaged with a spool portion 22a of the cartridge 23, and is pushed downwardly as seen in the drawing by this spool portion 22a against the urging force of the fork spring 27. Reference numeral 28 indicates a gear pressing member (support member), which rotatably supports the idler gear 24 and the fork gear 25. Reference numeral 10 indicates a casing member forming the outer casing of the camera and arranged in close vicinity to the gear pressing member 28.

Next, the features of this embodiment will be described.

At the bottom portion of the cartridge chamber 29, there is formed a hole 21c whose diameter is smaller than the outer diameter of the cartridge 23, and the fork gear 25 is accommodated in this hole 21c. Further, the fork gear 25 is rotatably fixed to the gear pressing member 28 through the intermediation of a riveting pin 30.

By thus accommodating the fork gear 25 in the hole 21c, it is possible to arrange the gear pressing member 28 along the bottom portion of the cartridge chamber 29, and, unlike the structure in the prior art shown in FIG. 2, this structure allows substantial omission of the space for arranging the fork gear 25 between the bottom surface of the cartridge chamber 29 and the gear pressing member 28. That is, it is possible to bring the fork gear 25 and the gear pressing member 28 nearer to the cartridge 23, and to make the longitudinal length of the cartridge 23 so much the smaller. Since the casing member 10 is arranged in close vicinity to the gear pressing member 28, it is possible to reduce the height of the camera main body (i.e., achieve a reduction in camera size) by bringing the gear pressing member 28 nearer to the cartridge 23.

Further, by mounting the fork gear 25 rotatably to the gear pressing member 28 by means of the riveting pin 30, it is possible to prevent the fork gear 25 from moving in the longitudinal direction of the cartridge 23. Reference numeral 28 indicates the gear pressing member (retaining member) which rotatably supports the two gears 24 and 25. Reference numeral 30 indicates the riveting pin, which is rotatably riveted to the gear pressing member 28. Thus, the fork gear 25 is not detached from the gear pressing member 28.

Since the fork gear 25 is in mesh with the idler gear 24, it is necessary to secure the arrangement space for the idler gear 24 under the cartridge 23. In view of this, in this embodiment, no abutment surface 21b is provided on the shaft portion side of the lower portion of the cartridge 23. Thus, it is possible for the fork gear 25, the idler gear 24, and the gear pressing member 28 to be arranged so as to be parallel to each other and to extend in the direction perpendicular to the longitudinal direction of the cartridge 23 (i.e., in the horizontal direction of the camera main body).

In accordance with this embodiment described above, the gear member is brought nearer to the film cartridge by utilizing the space of the recess formed in one longitudinal end surface of the film cartridge, so that it is possible to make the longitudinal length of the cartridge accommodating portion so much the smaller, that is, to reduce the height of the camera main body as compared with that in the prior art (i.e., to achieve a reduction in camera size).

Further, since the gear member is brought nearer to the film cartridge by utilizing the space created by forming a hole in the cartridge accommodating portion as the accommodating space for the gear member, it is possible to make the longitudinal length of the cartridge accommodating portion so much the smaller, that is, to reduce the height of the camera main body as compared with that in the prior art (i.e., to achieve a reduction in camera size).

What is claimed is:

1. A camera equipped with an accommodating chamber which accommodate a film cartridge having a recess at one longitudinal end, and film spool spindle thereof, the camera comprising:

a protruding surface portion which is provided in the accommodating chamber, which enters the recess, and which has on the outer surface thereof on the side opposite to the film cartridge a step formed by a recessed portion recessed toward the film cartridge; and a gear member, a portion formed with teeth at the periphery of the gear member being arranged in the recessed portion and a fork adapted to be intearally rotated with the gear member engaging with the film spool spindle to rotate the film spool spindle.

2. A camera according to claim 1, further comprising a support plate which rotatably supports the gear member, wherein the portion formed with the teeth at the periphery of the gear member is accommodated in a space between the step of the accommodating chamber and the support plate.

3. A camera according to claim 1, further comprising a gear engaged with the portion formed with the teeth at the periphery of the gear member and adapted to transmit torque to the gear member, wherein said step is not provided in a portion opposite to said sear in the accommodating chamber.

4. A camera equipped with an accommodating chamber which accommodates a film cartridge having a recess at one longitudinal end, and film spool spindle thereof, the camera comprising:

a fork that is integrally rotated with a gear member engaged with the film spool spindle to rotate the film spool spindle;

a retaining member rotatably retaining a portion formed with teeth at the periphery of the gear member; and an opening formed in a portion of the accommodating chamber corresponding to the recess of the film cartridge, the portion formed with the teeth at the periphery of the gear member entering the opening.

* * * * *

UNITED STATES PATENT AND TRADEMARK OFFICE
CERTIFICATE OF CORRECTION

PATENT NO. : 6,722,796 B2
DATED : April 20, 2004
INVENTOR(S) : Kenji Ito

It is certified that error appears in the above-identified patent and that said Letters Patent is hereby corrected as shown below:

Column 6,
Line 29, delete "which accommodate" and insert -- which accommodates --.
Line 39, delete "be intearally" and insert -- be integrally --.
Line 51, delete "said sear" and insert -- said gear --.

Signed and Sealed this

Twenty-first Day of March, 2006

JON W. DUDAS
*Director of the United States Patent and Trademark Office*